United States Patent Office 2,941,439
Patented June 21, 1960

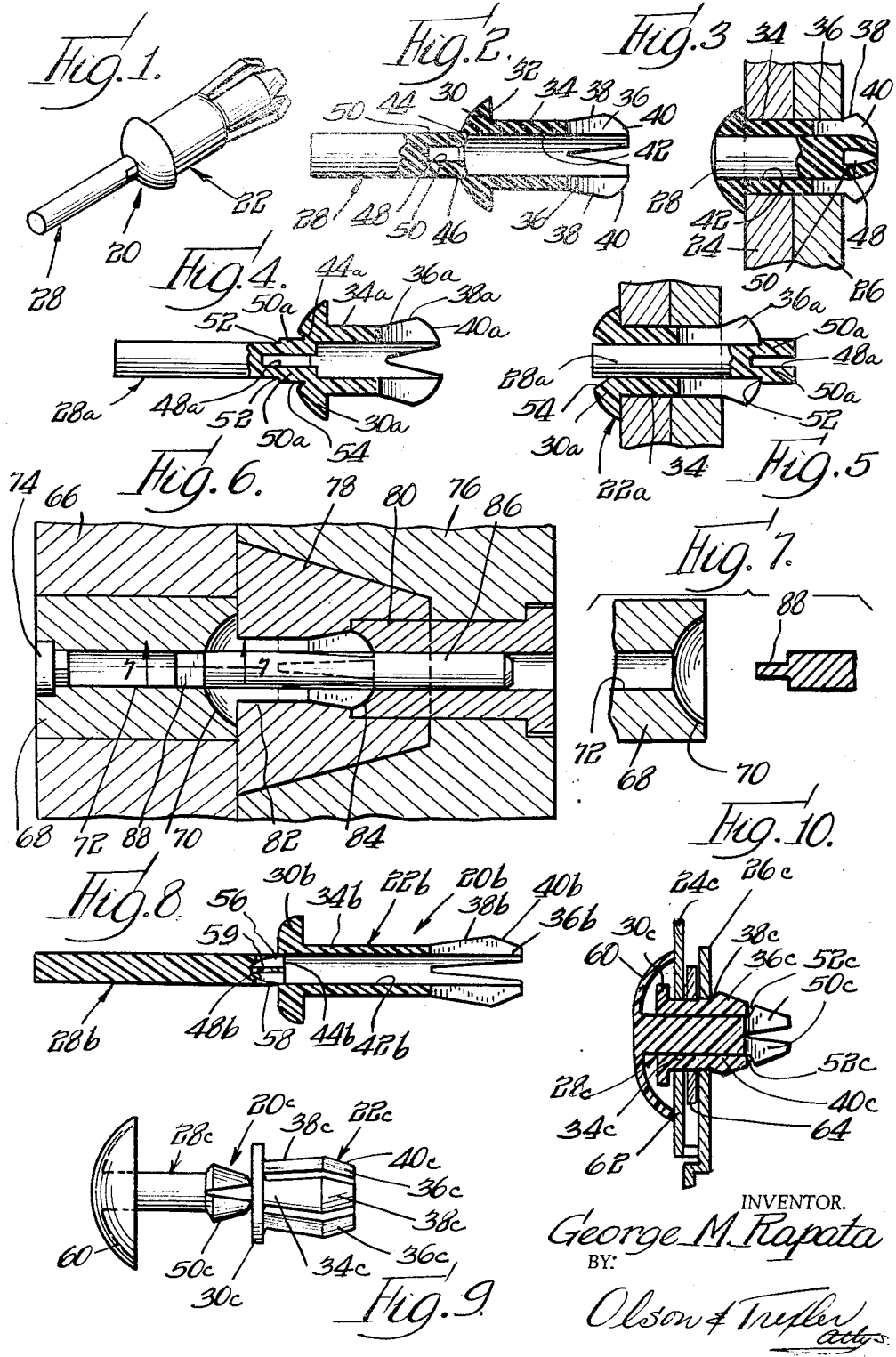

2,941,439
RIVET AND INTEGRAL EXPANDER PIN CONNECTED THERETO BY AREA OF LIMITED CROSS SECTION

George M. Rapata, Chicago, Ill., assignor to Illinois Tool Works, Chicago, Ill., a corporation of Illinois Filed Jan. 30, 1957, Ser. No. 637,112

2 Claims. (Cl. 85—40)

The present invention relates to a novel fastening device, and more particularly to a novel plastic fastener adapted to be applied to an apertured work structure.

Fastening devices having a body insertable into an apertured work structure and a drive pin initially integrally connected to and extending outwardly from a head of the body and adapted to be driven into the body have heretofore been suggested. While such prior proposals have in many instances been satisfactory, considerable difficulty has been encountered, especially with fastening devices of considerable length, in that the drive pins have not been easy to start into the body member and they are frequently sheared off and driven in at peculiar angles so that the device is not properly secured within a workpiece. Additional difficulties have been encountered in the production of such heretofore proposed fastening devices in that heretofore used core pins have not been easy to maintain centrally within a mold cavity.

An important object of this invention is to provide a novel plastic fastening device having a centrally apertured body member or rivet-like portion adapted to be inserted into a workpiece structure aperture and an integral drive pin initially projecting from an end of the body member and adapted to be driven into the body member aperture for more securely fixing the body member within the work structure, said fastening device being constructed so as to promote proper shearing of the integral connection between the body member and the drive pin and so as to facilitate entry of the drive pin into the body member aperture.

A further object of the present invention is to provide a novel fastening device of the above described type which may be more easily accurately molded than generally similar heretofore proposed fastening device.

Still another object of the present invention is to provide a novel fastening device having an apertured body member adapted to extend through a work structure and a drive pin insertable within the apertured body member, which fastening device is constructed so as to promote expansion of an entering end portion of the body member behind and into aggressive engagement with the work structure while at the same time facilitating passage of the drive pin through the body member.

A still further object of the present invention is to provide a novel fastening device of the above described type which adapted resiliently to clamp a plurality of workpieces together.

Other objects and advantages of the present invention will become apparent from the following description and the accompanying drawings wherein:

Fig. 1 is a perspective view showing a fastening device incorporating the features of the present invention;

Fig. 2 is an enlarged partial sectional view of the fastening device shown in Fig. 1;

Fig. 3 is a partial sectional view showing the fastening device fully applied to an apertured work structure;

Fig. 4 is a partial sectional view showing a modified form of the present invention;

Fig. 5 is a partial sectional view showing the embodiment of Fig. 4 applied to an apertured work structure;

Fig. 6 is a fragmentary partial sectional view showing a mold construction for producing a fastening device in accordance with the present invention;

Fig. 7 is a fragmentary exploded sectional view taken along line 7—7 in Fig. 6;

Fig. 8 is a sectional view showing another modified form of the present invention;

Fig. 9 is an elevational view showing another modified form of the present invention; and Fig. 10 is a sectional view showing the embodiment of Fig. 9 fully applied to a work structure.

Referring now more specifically to the drawings wherein like parts are designated by the same numerals throughout the various figures, a fastening device 20 incorporating the features of the present invention is shown in Figs. 1, 2 and 3. This fastening device comprises a body or rivet section 22 adapted to be inserted through an apertured work structure such as apertured panels 24 and 26 shown in Fig. 3, and a drive pin 28.

The body or rivet section 22 is provided with an enlarged head 30 having a radially extending work engaging surface 32. An elongated shank 34 extends axially from the head portion 30, and an entering end portion of the shank is split so as to provide a plurality of circumferentially spaced axially extending resilient fingers 36. Each of these fingers is formed with a laterally extending surface or shoulder 38 facing generally toward the head portion surface 32 for engaging behind the work structure and corporating with the head portion for securing the body or rivet section in assembled relationship with the work structure. The entering ends of the fingers are provided with converging cam surfaces 40 which serve to radially collapse the fingers or cam the fingers inwardly during initial insertion of the body section into a work structure aperture so as to facilitate assembly of the body section with the work structure. The body or rivet section is provided with a central axially extending bore 42 which preferably is of substantial uniform shape throughout the shank and finger portions and the head portion.

The drive pin 28 is formed so that its entering end initially projects slightly within the bore and the head portion 30 and is integrally joined to the head portion as indicated at 44 and 46. It is to be noted that a slot 48 traverses the entering end portion of the drive pin. This provides the drive pin entering end portion with a plurality of relatively resilient fingers 50 and also serves to reduce the area of the integral junctions 44 and 46 between the drive pin and the head 30.

When applying the fastening device to a work structure, the body or rivet section 22 is first inserted through the work structure apertures until the head engages the work structure as will be understood. Then an impact or other force is applied to the outer end of the pin 28 for driving the pin into the bore 42. When such a force is applied, the initial action is shearing of the integral junctions 44 and 46, which shearing is accomplished relatively easily as a result of the limited area of the junctions. Then the finger portions 50 of the drive pin are free to collapse toward each other whereby to, in effect, provide the drive pin with a pointed entering end and thereby facilitate passage of the drive pin into the bore 42. The diameter of the drive pin 28 is such that it is retained within the bore 42 with a force fit. Preferably, the diameter of the apertures in the workpieces is only slightly greater than the diameter of the shank 34, and the drive pin serves to expand the shank substantially throughout its length into engagement with the walls of the workpiece apertures for maximum gripping action. The drive pin also serves to expand the finger portions 36 of the body or rivet section so that their shoulder surfaces 38 are urged into aggressive engagement with the work structure oppositely from the head portion 30. As shown in Fig. 3, the finger portions 50 of the drive pin may be at least partially collapsed when the pin is fully inserted so as resiliently to urge the outer or entering end portions of the fingers 36 into engagement with the work structure. However, the lengths of the body or rivet section 22 and the drive pin 28 and the slot 48 in the drive pin are preferably correlated with the overall thickness of the work structure so that the solid portion of the drive pin extends substantially completely through the work structure for firmly supporting all of the portions of the rivet section disposed within the work structure apertures.

Figs. 4 and 5 show a modified embodiment of the present invention which is similar to the above described structure as indicated by application of identical reference numerals with the suffix $a$ added to corresponding elements. In this embodiment the finger portions 50$a$ of the drive pin are provided with radially projecting shoulders 52, and the length of the drive pin exceeds the overall length of the body or rivet section. Thus, when the drive pin is forced through the bore 42, the shoulders 52 will be located for engaging the terminal ends of the finger portions 36$a$ so as to preclude withdrawal of the drive pin. This embodiment shows another feature for further facilitating initial entry of the drive pin into the body or rivet section bore, and it is to be understood that this additional feature may be incorporated in the other embodiments disclosed herein if desired. More specifically, an annular beveled groove 54 is provided in the outer end of the head portion 30$a$ around the entering end of the drive pin so that when the integral junctions between the drive pin and the head portion are sheared the head portion will be provided with a beveled or enlarged mouth as shown in Fig. 5.

Fig. 8 shows another embodiment of the present invention in which elements similar to those described above are designated by the same reference numerals with the suffix $b$ added. In this embodiment, the slot 48$b$ traverses the integral junctions between the drive pin and the head portion 30$b$ and extends slightly outwardly from the head portion from where opposite edges of the slot converge in the manner shown so that the opposite sides of the drive pin between its finger portions are interrupted only between the points 56 and 58 and the head portion 30$b$. There is also provided a blot 59 which is identical to but at right angles to the slot 48$a$. As a result, the pin is connected at two pairs of diametrically opposite circumferentially limited areas whereby the end of the pin will collapse radially in all directions for further facilitating entry into the bore. Any danger of foreign material entering the slots is greatly minimized and the drive pin presents a substantially solid appearance while still permitting the advantages mentioned above to be obtained. The pins of the other embodiments may also be connected at four limited areas rather than two more extensive areas, if desired.

Figs. 9 and 10 show another embodiment of the present invention in which elements similar to those described above are identified by identical reference numerals with the suffix $c$ added. In this embodiment, the shoulders 52$c$ on the finger portions of the drive pin are inclined away from the head of the fastening device, so that the shoulders will act to cam the drive pin finger portions inwardly to permit removal of the drive pin, if desired. In addition, the drive pin 28$c$ is provided with an enlarged dished-shape head 60 extending radially beyond the head portion 30$c$ and presenting an annular work engaging surface 62. The construction is such that when the drive pin is fully inserted the head 60 which is resilient is drawn tightly against the work structure and placed in a stressed condition so that the elements of the work structure are resiliently clamped together. As shown in Fig. 10, this embodiment is particularly adapted to clamp securely a pair of apertured panels 24$c$ and 26$c$ together which panels may be separated by a spacing washer 62. In the embodiment shown the aperture in the panel 24$c$ has a diameter less than the head portion 30$c$, but it is to be understood that this structure would be effected for securing the panels together in the event the aperture in the panel 24$c$ is made larger than the head portion 30$c$. It is also to be understood that the other embodiments described herein could be provided with a head on the drive pin similar to the head 60, if desired.

In Figs. 6 and 7 there is shown a portion of a mold structure which may be utilized for forming the fastening devices of the present invention, and for purposes of illustration, the mold structure is particularly adapted for forming the fastening device shown in Figs. 1-3. This mold structure comprises a head cavity plate 66 supporting a member 68 having a head cavity 70 therein and a cavity 72 for the drive pin extending from the head cavity. The cavity or bore 72 is closed at its outer end by a vent plug 74. A rear or movable cavity plate 76 abuts the plate 66 and supports members 78 and 80 having cavities 82 and 84 therein respectively which combine to provide the shank forming cavity. A core pin 86 has one end secured within a bore in the member 80 and projects through the shank and head cavities. It is to be noted that the free end of the core pin is cut away at its opposite sides so as to leave a central axially extending fin 88. This fin is adapted to project into the drive pin cavity 72 and serves to form the slot in the entering end of the drive pin. It is also important to note that the fin 88 when positioned in the drive pin cavity serves to support the free end of the core pin so as to insure that the core pin will be maintained centrally within the head and shank cavities.

While the preferred embodiments of the present invention have been shown and described herein, it is obvious that many structural details may be changed without departing from the spirit and scope of the appended claims.

The invention is claimed is follows:

1. A one-piece plastic rivet-type fastener comprising an elongated hollow shank, a work-engaging head extending radially outwardly from said shank at one extremity thereof, the opposite extremity of said hollow shank being longitudinally slotted to provide a plurality of transversely yieldable tongues, said tongues having radially thicker portions than said shank and being adapted to engage the side of an apertured workpiece oppositely disposed from the side engaged by said head, and a relatively long solid pin conforming substantially in diameter with the hollow in the shank, said pin extending axially substantially entirely externally from and formed integral and connected with said head by an area of limited cross section and adapted to be readily sheared, the portion of said pin adjacent to and externally of said head being transversely slotted from its head connecting end outwardly of said head to provide a plurality of spaced circumferential pin and head connecting areas of limited cross section whereby to facilitate shearing of said connecting areas when the pin is driven into telescopic association with the hollow of said shank, the disposition of said transverse apertured portion of the pin permitting radial collapsing of the pin stock in that vicinity as an incident to the initial axial shifting of the pin into telescopic association with the hollow of said shank.

2. A one-piece plastic rivet-type fastener as set forth in claim 1, wherein the pin is greater in length than the shank and is provided at the collapsible extremity thereof with shoulder means adapted to interlock with the free extremity of the shank after the pin has been completely inserted within the shank.

References Cited in the file of this patent
UNITED STATES PATENTS

| | | |
|---|---|---|
| 1,537,521 | Assorati | May 12, 1925 |
| 1,852,089 | Pleister et al. | Apr. 5, 1932 |
| 2,108,842 | Bazzoni | Feb. 22, 1938 |
| 2,402,287 | Kearns | June 18, 1946 |
| 2,585,285 | Tonge et al. | Feb. 12, 1952 |
| 2,664,458 | Rapata | Dec. 29, 1953 |